(12) United States Patent
Huang

(10) Patent No.: US 11,682,858 B2
(45) Date of Patent: Jun. 20, 2023

(54) MOUNTING BRACKET AND ELECTRONIC DEVICE

(71) Applicant: SHENZHEN CHENBEI TECHNOLOGY CO., LTD., Shenzhen (CN)

(72) Inventor: Jinlong Huang, Shenzhen (CN)

(73) Assignee: SHENZHEN CHENBEI TECHNOLOGY CO., LTD., Shenzhen (CN)

( * ) Notice: Subject to any disclaimer, the term of this patent is extended or adjusted under 35 U.S.C. 154(b) by 165 days.

(21) Appl. No.: 17/190,163

(22) Filed: Mar. 2, 2021

(65) Prior Publication Data

US 2021/0336383 A1 Oct. 28, 2021

(30) Foreign Application Priority Data

Apr. 22, 2020 (CN) .......................... 202010321141.9

(51) Int. Cl.
*H01R 13/62* (2006.01)
*H01R 13/66* (2006.01)
*H01R 31/06* (2006.01)

(52) U.S. Cl.
CPC ......... *H01R 13/6205* (2013.01); *H01R 13/66* (2013.01); *H01R 31/06* (2013.01); *H01R 2201/04* (2013.01)

(58) Field of Classification Search
CPC .... H01R 13/6205; H01R 13/66; H01R 31/06; H01R 2201/04; H02J 7/0045; H02J 7/0044; H02J 7/00034; H02J 2207/40
See application file for complete search history.

(56) References Cited

U.S. PATENT DOCUMENTS

| | | | | |
|---|---|---|---|---|
| 5,648,712 A * | 7/1997 | Hahn | ..................... | H02J 7/0044 320/113 |
| 5,656,914 A * | 8/1997 | Nagele | .................. | H02J 7/0042 320/113 |
| 6,049,192 A * | 4/2000 | Kfoury | ................. | H02J 7/0044 320/113 |
| 6,316,911 B1 * | 11/2001 | Moskowitz | ........... | H02J 7/0042 320/DIG. 34 |
| 6,498,458 B1 * | 12/2002 | Chen | ..................... | H02J 7/0044 320/114 |
| 6,553,711 B1 * | 4/2003 | Feng | ..................... | A01M 29/16 43/132.1 |
| 6,774,603 B2 * | 8/2004 | Liao | ...................... | H02J 7/0042 320/112 |
| 6,821,134 B2 * | 11/2004 | Chen | ..................... | H01R 35/04 439/11 |
| 7,176,656 B2 * | 2/2007 | Feldmann | ................ | B25F 5/00 320/112 |

(Continued)

*Primary Examiner* — Thanh Tam T Le
(74) *Attorney, Agent, or Firm* — Anova Law Group, PLLC

(57) ABSTRACT

A mounting bracket for an electronic device is provided. The mounting bracket includes a first mounting member and a second mounting member. The first mounting member is configured to detachably accommodate a body of the electronic device and limit a position of the body. The second mounting member is configured to detachably accommodate an adaptor of the electronic device and limit a position of the adaptor. The first mounting member is fixedly connected to the second mounting member.

19 Claims, 7 Drawing Sheets

(56) References Cited

U.S. PATENT DOCUMENTS

| | | | | |
|---|---|---|---|---|
| 7,365,514 B2* | 4/2008 | Tong | .............. | H02J 7/0042 |
| | | | | 320/112 |
| 7,489,952 B2* | 2/2009 | Simoes | ............ | H02J 7/0044 |
| | | | | 320/112 |
| 7,658,625 B2* | 2/2010 | Jubelirer | ........ | H01R 31/065 |
| | | | | 439/954 |
| 7,812,567 B2* | 10/2010 | Shen | .............. | H02J 7/0044 |
| | | | | 320/113 |
| 8,072,183 B2* | 12/2011 | Griffin, Jr. | ........ | H02J 7/342 |
| | | | | 320/112 |
| 8,251,157 B2* | 8/2012 | Gray | ............ | H01M 50/213 |
| | | | | 173/171 |
| 8,564,243 B2* | 10/2013 | Chen | .............. | H02J 7/0042 |
| | | | | 320/108 |
| 8,686,683 B2* | 4/2014 | Caskey | ............ | H02J 7/04 |
| | | | | 320/112 |
| 9,437,983 B2* | 9/2016 | Casale | ............ | H01R 13/533 |

* cited by examiner

MOUNTING BRACKET AND ELECTRONIC DEVICE

CROSS-REFERENCE TO RELATED APPLICATION

This application claims priority to Chinese Patent Application No. 202010321141.9, filed on Apr. 22, 2020, the entire content of which is incorporated herein by reference.

TECHNICAL FIELD

The present disclosure generally relates to the electronic device installation technology field and, more particularly, to a mounting bracket and an electronic device using the mounting bracket.

BACKGROUND

Gateway equipment is also referred to as a network connector or a protocol converter, which is a computer system or equipment for providing data conversion service between a plurality of networks. The existing mounting bracket may fix the gateway equipment. For an electronic device having an adaptor, the electronic device is connected to the adaptor via a data cable/power cable. Even after the electronic device is fixed by the mounting bracket, a problem of poor contact of the data cable/power cable may still exist. Moreover, the electronic device is difficult to detach from the mounting bracket and is not convenient for a user to use.

SUMMARY

One aspect of embodiments of the present disclosure provide a mounting bracket applied to an electronic device. The mounting bracket includes a first mounting member and a second mounting member. The first mounting member is configured to detachably accommodate a body of the electronic device and limit a position of the body. The second mounting member is configured to detachably accommodate an adaptor of the electronic device and limit a position of the adaptor. The first mounting member is fixedly connected to the second mounting member.

Another aspect of embodiments of the present disclosure provide an electronic device including a body and an adaptor. The electronic device can be attached to the mounting bracket detachably. The body is configured to be attached assembled to a first mounting member of the mounting bracket. The adaptor is configured to be detachably attached to a second mounting member of the mounting bracket. A position-limiting unit is disposed on the first mounting member. A plug slot is disposed on the body. The plug slot and the position-limiting unit form a plug connection.

Another aspect of embodiments of the present disclosure provide an electronic device including a body, an adaptor, and a cable. The electronic device can be attached to the mounting bracket detachably. The body is configured to be attached assembled to a first mounting member of the mounting bracket. The adaptor is configured to be detachably attached to a second mounting member of the mounting bracket. The cable connects between the adaptor and the body. The cable is detachably stowed in a cable collection groove, and the cable collection groove is arranged on an outside surface of the body.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

REFERENCE NUMERALS

Figure 1:
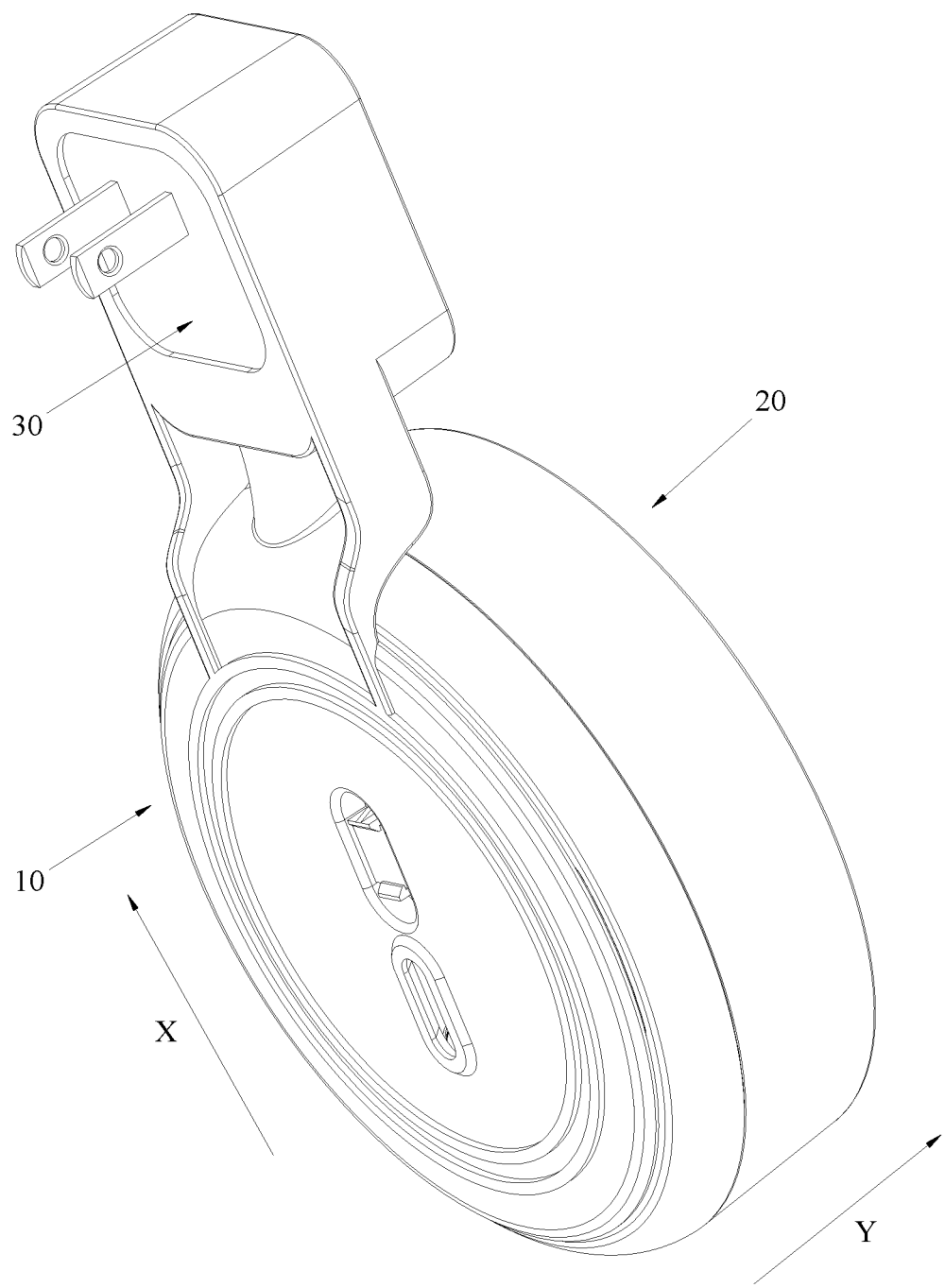
FIG. 1 is a schematic diagram of a perspective view of an electronic device attached to a mounting bracket according to some embodiments of the present disclosure.
Figure 2:
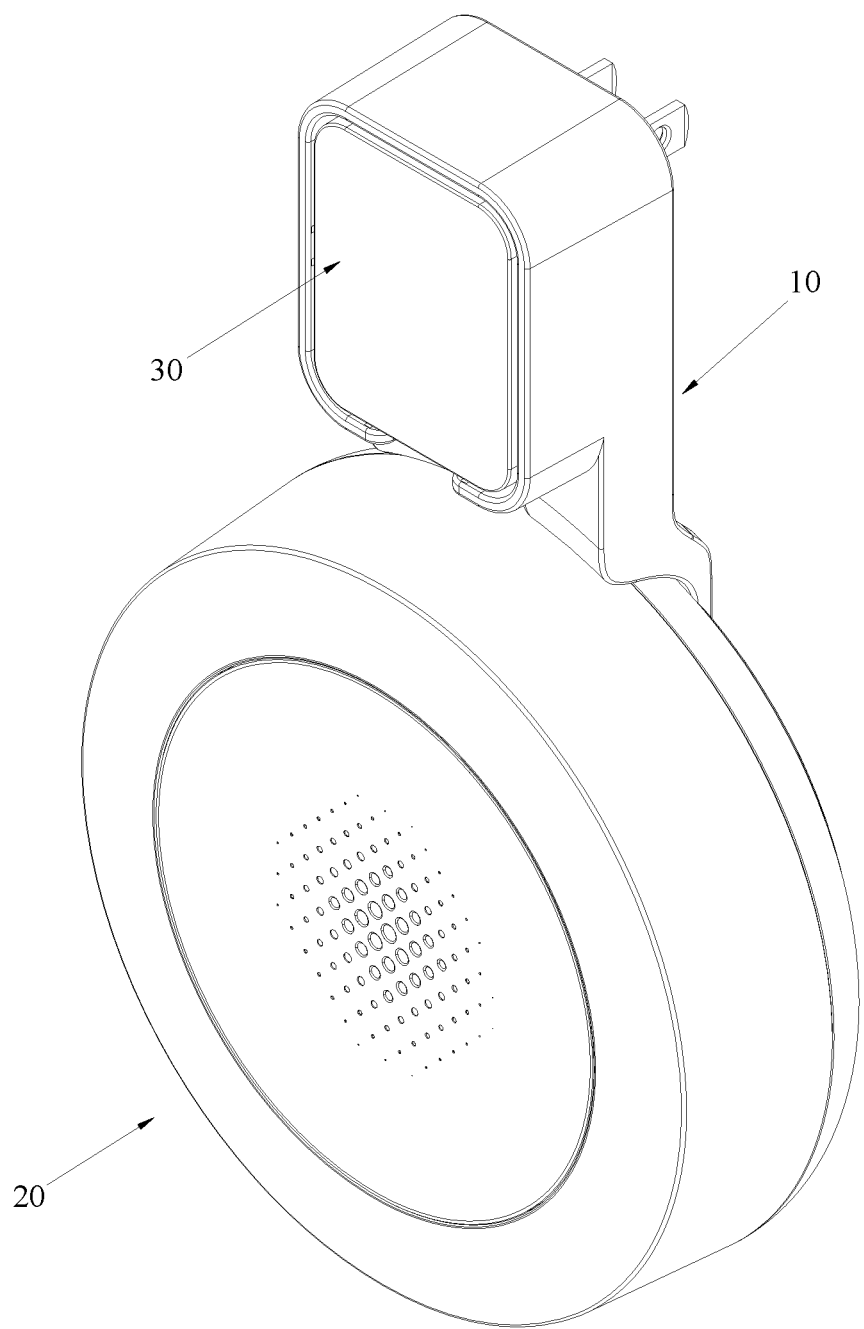
FIG. 2 is a schematic diagram of a perspective view from another angle of the electronic device attached to the mounting bracket according to some embodiments of the present disclosure.

Mounting bracket—10; Body—20; Adaptor—30; Cable—40; First mounting member—11; Second mounting member—12; Connector—13; First magnetic member—14; Second magnetic member—21; Second mounting slot—22; Plug slot—23; Cable collection groove—24; Power plug hole—25; First end—41; Middle section—42; Second end—43; Position-limiting unit—111; First mounting slot—112; Snap hook—113; Mounting hole—114; First fitting surface—115; Containing chamber—121; First opening—122; Second opening—123; Elastic strip—124; Second fitting surface—125; Side notch—126; Position-limiting slot—131; Curved surface—132; First section—241; Second section—242; First direction—X.

DETAILED DESCRIPTION OF THE EMBODIMENTS

To make the technical problem, technical solution, and beneficial effect clearer, the present disclosure is further described in detail in connection with accompanying drawings and embodiments. Embodiments of the present disclosure are merely used to describe the present disclosure and are not used to limit the present disclosure.

When an element is described to be "fixed to" or "disposed on" another element, the element may be directly or indirectly fixed to or disposed on the another element. When an element is described to be "connected to" another element, the element may be directly or indirectly connected to the another element.

The terms "length," "width," "up," "down," "front," "rear," "left," "right," "vertical," "horizontal," "top," "bottom," "inside," "outside," etc., are used to indicate a position or position relationship based on a position or position relationship shown in the accompanying drawings, which are merely used to describe certain embodiments of the present disclosure and simplify the description and do not indicate or imply that the corresponding device or element has a necessary specific position or is constructed and operated in a specific position. Thus, the terms do not limit the present disclosure.

In addition, the terms "first" and "second" are merely used for description, which cannot be considered to indicate or imply relative importance or implicitly indicate the number of technical features indicated. Therefore, the features described by "first" and "second" may include one or more of the features explicitly or implicitly. In the description of the present disclosure, "a plurality of" indicates two or more than two, unless specified otherwise.

Referring to FIG. 1 to FIG. 4, a mounting bracket 10 according to certain embodiments of the present disclosure is described.

The mounting bracket 10 may be configured to accommodate and fasten an electronic device. In some embodiments, the electronic device may include but is not limited to a device such as a gateway device that needs to be connected to an adaptor.

The electronic device includes a body 20 and an adaptor 30. The mounting bracket 10 may be configured to accommodate and fasten both the body 20 and the adaptor 30 of the electronic device, such that after the adaptor 30 is plugged in at a wall (e.g., a vertical wall, a horizontal wall, a slanted wall, etc.), the whole electronic device may be hung on the wall. In some other embodiments, according to an actual situation and specific requirement, the electronic device may be other devices that include the adaptor 30 and are not too large and too heavy, such as a router, a smart gateway, a smart speaker, a camera, etc. In addition, the electronic device may be horizontally plugged in a socket on the ground or on a table. The location of the socket being plugged in with the electronic device is not limited uniquely here. After the electronic device is attached to the mounting bracket 10, the electronic device plugged in the socket can also be compact and does not occupy a large area.

Figure 3:
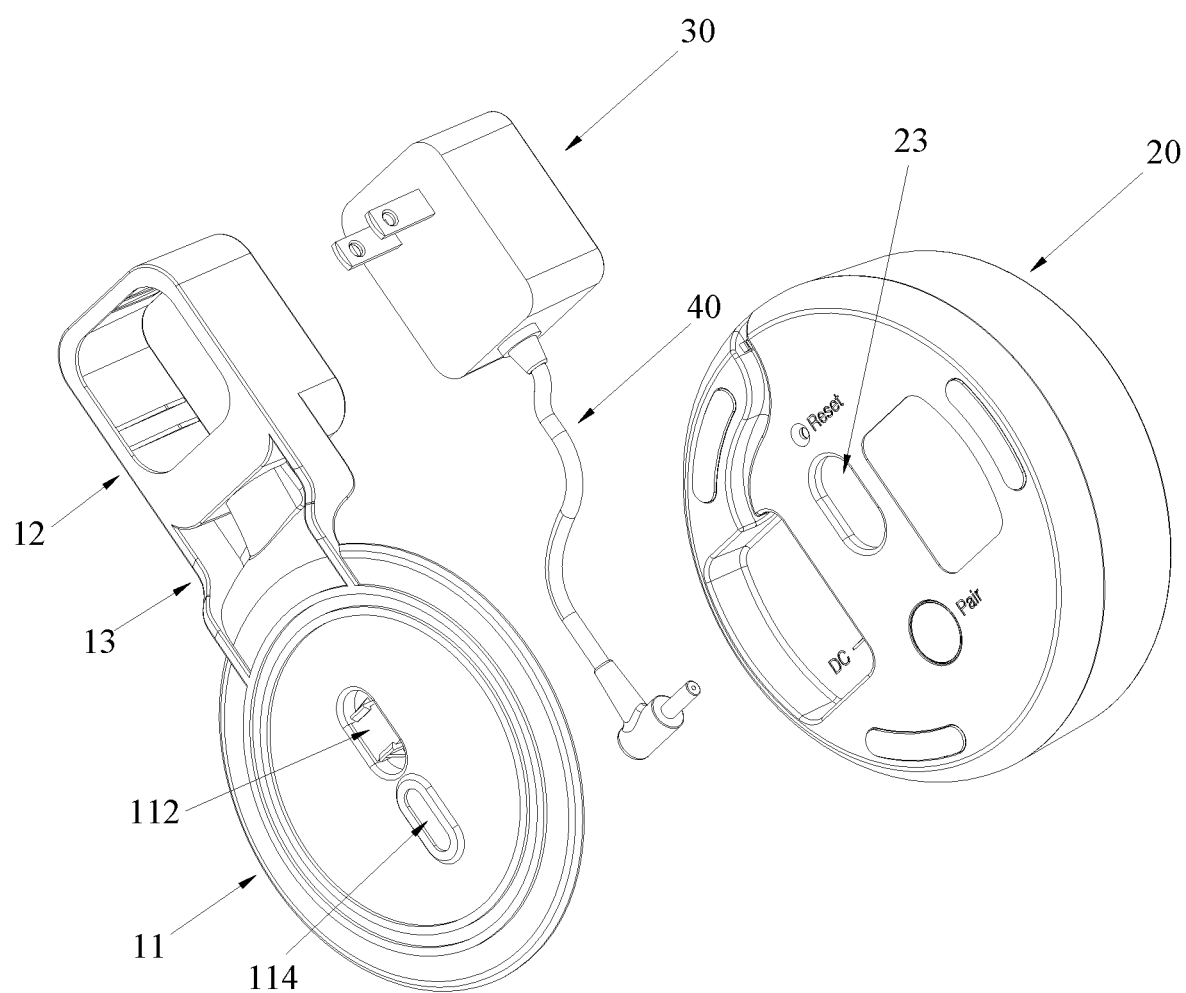
FIG. 3 is a schematic diagram of an exploded view of the electronic device and the mounting bracket shown in FIG. 1.

Referring to FIG. 3, the electronic device of embodiments of the present disclosure refers to an electronic device including an adaptor 30. The electronic device includes the body 20 and the adaptor 30. The body 20 is connected to the adaptor 30 via a cable 40. The cable 40 may be a data cable. Since the cable 40 is flexible, the body 20 and the adaptor 30 are not relatively fixed to each other. After the adaptor 30 is plugged into a socket on the wall, the body 20 may be hung in the air by the cable 40, which may cause the body 20 to be unstable. In other embodiments, the body 20 may be put on a holding structure (e.g., a table) nearby. Therefore, only a socket near the table may be used, as a result, the electronic device may occupy a large space and is not convenient to use. When the adaptor 30 is plugged into a horizontal socket, the relative position between the adaptor 30 and the body 20 may be not fixed, the electronic device may occupy a large space, have a messy appearance, be unaesthetic, and may also cause a problem of poor contact of the data/power cable.

The mounting bracket 10 of the present disclosure may solve the above problem, which may fix a relative position between the body 20 and the adaptor 30.

Figure 4:
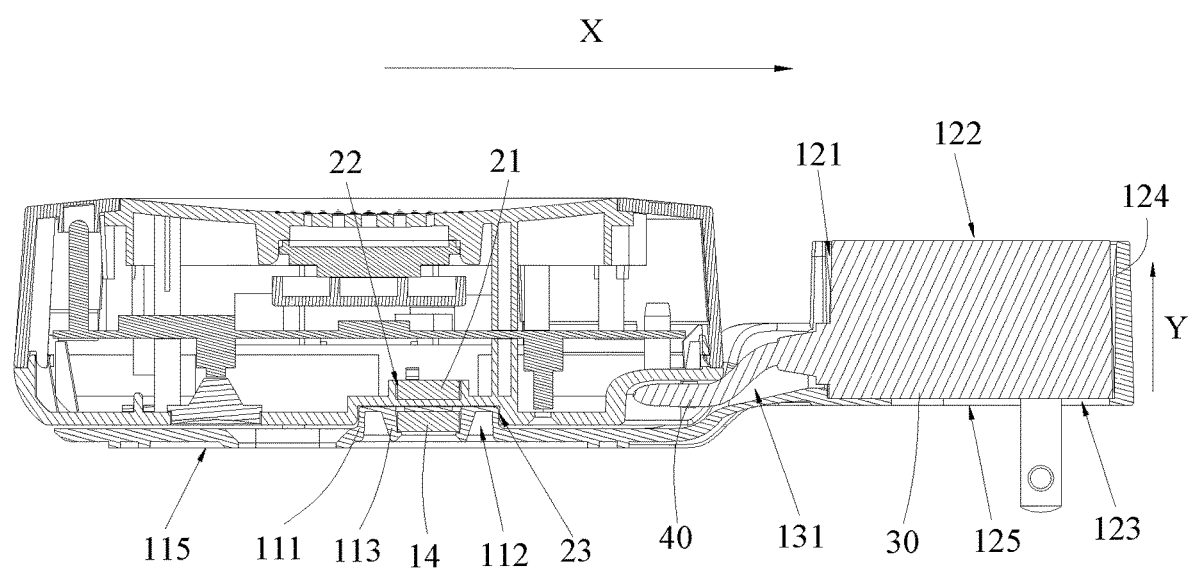
FIG. 4 is a schematic diagram of a cross-sectional view of the electronic device attached to the mounting bracket shown in FIG. 1.

In some embodiments, referring to FIG. 3 and FIG. 4, the mounting bracket 10 includes a first mounting member 11 and a second mounting member 12. The first mounting member 11 is fixedly connected to the second mounting member 12. The first mounting member 11 may be configured to accommodate the body 20 of the electronic device detachably and limit a position of the body 20. The second mounting member 12 may be configured to house the adaptor 30 of the electronic device detachably and limit a position of the adaptor 30. Since the first mounting member 11 and the second mounting member 12 are fixedly connected to each other, after the body 20 and the adaptor 30 are respectively attached to the first mounting member 11 and the second mounting member 12, the body 20 and the adaptor 30 can be relatively fixed. That is, by mounting the electronic device to the mounting bracket 10, the body 20 and the adaptor 30, which are originally separated from each other (that is, their relative positions are changeable), may be fastened together. As such, since the body 20, the adaptor 30 and the mounting bracket 10 are fixed together, when the adaptor 30 is plugged into the socket to assume a fixed position, the whole electronic device is also fixed relative to the socket.

The disclosed mounting bracket 10 may secure relative positions of the body 20 and the adaptor 30 of the electronic device by providing the first mounting member 11 and the second mounting member 12 that are fixedly connected. As such, the problem of the poor contact after the adaptor 30 is plugged into the socket is solved. Meanwhile, the whole structure of the electronic device is aesthetic, and the electronic device can, after being attached to the mounting bracket 10, be conveniently plugged into or unplugged from the socket. The electronic device also has a compact structure and is aesthetic after being plugged into the socket.

Referring to FIG. 4, a first magnetic member 14 is disposed on the first mounting member 11. The first magnetic member 14 may be configured to attract the body 20 to let the first mounting member 11 to be fitted/attached to the outer wall of the body 20. During installation, the first mounting member 11 only needs to be placed near the outer wall of the body 20. When the first magnetic member 14 attracts the body 20, the first mounting member 11 may be attached to the outer wall of the body 20 tightly. The first mounting member 11 being attached to the outer wall of the body 20 through the attraction of the first magnetic member 14 simplifies the structure design of the first mounting member 11, and the first mounting member 11 may not affect the appearance of the body 20. Therefore, after the electronic device is plugged into the wall, the whole electronic device is aesthetic. In addition, the magnetic installation makes the disassembling and assembling between the electronic device and the mounting bracket easy, and is simple to operate.

Referring to FIG. 3, the body 20 may have a cylindrical shape. The first mounting member 11 has a thin plate structure and is attached to an end surface of the body 20 along an axial direction. The first mounting member 11 is circular. An outer diameter of the first mounting member 11 is smaller than an outer diameter of the body 20. As such, the first mounting member 11 may occupy a small volume, which may not affect the whole appearance of the body 20 after being attached to the first mounting member 11.

Figure 6:
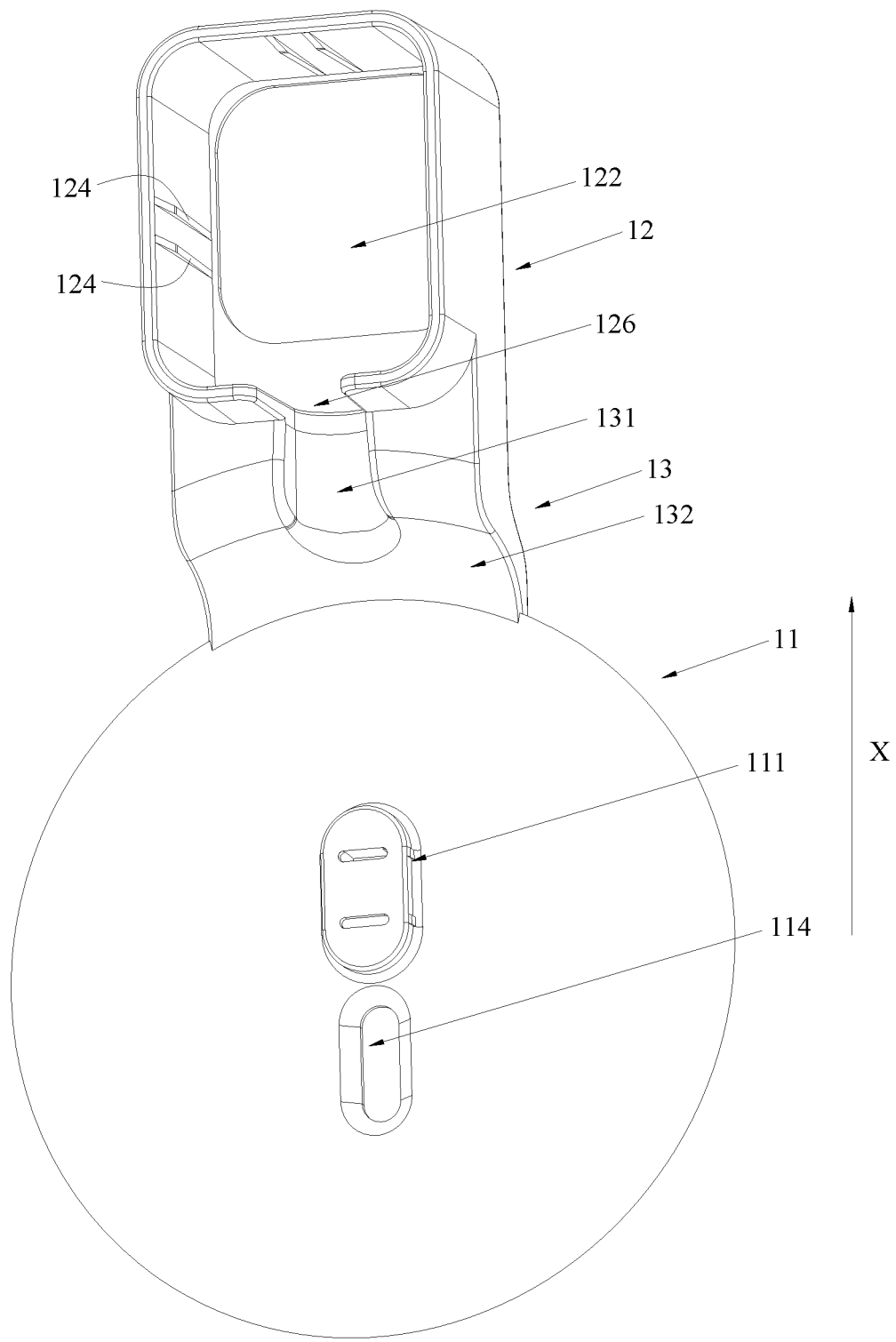
FIG. 6 is a schematic diagram of a rear view of the mounting bracket shown in FIG. 5.

In some embodiments, referring to FIG. 4 and FIG. 6, a position-limiting unit 111 is provided at the first mounting member 11. The position-limiting unit 111 may be configured to cooperate with the body 20 to form a plug-in structure and limit the position and enhance the fixed connection between the body 20 and the first mounting member 11. The present disclosure does not limit quantity and position of the position-limiting unit 111 that cooperates with the body 20 through plug connection. During the installation, the position-limiting unit 111 may be first positioned and aligned with the body 20, then, the first mounting member 11 forms a plug-in structure/connection with the body 20. Eventually, the body 20 and the first mounting member 11 are attached through the attraction of the first magnetic member 14. After the installation, the positioning of the electronic device is accurate, and the connection between the electronic device and the mounting bracket 10 is firm.

In some embodiments, referring to FIG. 4, the position-limiting unit 111 is a protrusion extending toward the body 20. The protrusion may be configured to be inserted into the body 20 to form the plug connection with the body 20. In some other embodiments of the present disclosure, according to the actual situation and specific requirement, the position-limiting unit 111 may also be a concave slot, correspondingly, a protrusion may be provided at the body 20, which is not limited here.

Referring to FIG. 4 and FIG. 6, the first mounting member 11 and the second mounting member 12 form a connection along a first direction X. The first direction X is a left and right direction in FIG. 4 and an up and down direction in FIG. 6. A side surface of the first mounting member 11 has a circle shape, and a side surface of the second mounting member 12 has a rectangle shape. In some other embodiments, the first mounting member 11 may be other shapes, as long as the shapes may adapt to the body 20. The second mounting member 12 may also be other shapes, as long as the shapes may adapt to the adaptor 30, which are not limited here.

The position-limiting unit 111 has a racetrack shape (e.g., a rectangle with a pair of semi-circles positioned at opposite ends). The length/longitudinal direction of the position-limiting unit 111 is the same as the first direction X. As such, the connection strength of the body 20 and the first mounting member 11 along the first direction X may be increased. In some other embodiments, the shape of the position-limiting unit 111 may include a long circle, an oval, a rectangle, a square, a polygonal shape, etc., which is not limited here.

Referring to FIG. 1, the position-limiting unit 111 connects with the body 20 in a direction parallel with a direction of the adaptor 30 plugging into a socket. In some embodiments, the plug connection of the position-limiting unit 111 is a Y direction in FIG. 1. When the adaptor 30 is plugged into the socket on the wall vertically, the position-limiting unit 111 is horizontal. Since the gravity of the body 20 is vertically downward, the position-limiting unit 111 may support the body 20 to a certain degree. As such, the mounting bracket 10 may better fix the body 20 and the adaptor 30.

In some embodiments, the first magnetic member 14 is disposed in the position-limiting unit 111. As such, the position-limiting unit 111 may realize the plug connection and a magnetic attraction connection simultaneously, thus, the connection is firm, and the structure is simple. In some embodiments, referring to FIG. 4 and FIG. 5, a first mounting slot 112 is disposed in the first mounting member 11. The first mounting slot 112 extends inward in a vertically/latitudinally direction (e.g., along the Y direction) from a side of the first mounting member 11 away from the body 20. In actual design, the first mounting slot 112 is formed as long as the side of the first mounting member 11 away from the body 20 is provided concavely toward the direction of the body 20. Further, the first mounting slot 112 and the position-limiting unit 111 may be formed simultaneously, which can simplify the structure and have low cost of the manufacturing process. In some other embodiments, the first magnetic member 14 and the position-limiting unit 111 may also be arranged with an interval at the first mounting member 11, which is not limited here.

In some embodiments, referring to FIG. 4, the first magnetic member 14 is assembled to the first mounting member 11 through a snap fit. In some embodiments, two snap hooks 113 are provided in the first mounting slot 112. The two snap hooks 113 are arranged along the first direction X with an interval. The first magnetic member 14 is a magnet. The magnet is arranged in the first mounting slot 112 and is fixed by the two snap hooks 113 in the first mounting slot 112.

Referring to FIG. 4, the two snap hooks 113 are vertically disposed on the first mounting member 11. The hook portions of the two snap hooks 113 are facing each other. Reinforcing ribs are disposed on the backs of the two snap hooks 113. The reinforcing ribs may be prismatic and are configured to enhance the structural strength of the two snap hooks 113.

In some other embodiments, the first magnetic member 14 may also be assembled to the first mounting member 11 through an adhesion method or a screw locking method. The adhesion method is a method to coat adhesive over the first magnetic member 14, and then adhere the first magnetic member 14 at the first mounting member 11. The screw locking method is to lock the first magnetic member 14 directly at the first mounting member 11, or to use an installation plate that abuts the first magnetic member 14 and then lock the installation plate at the first mounting member 11.

Figure 5:
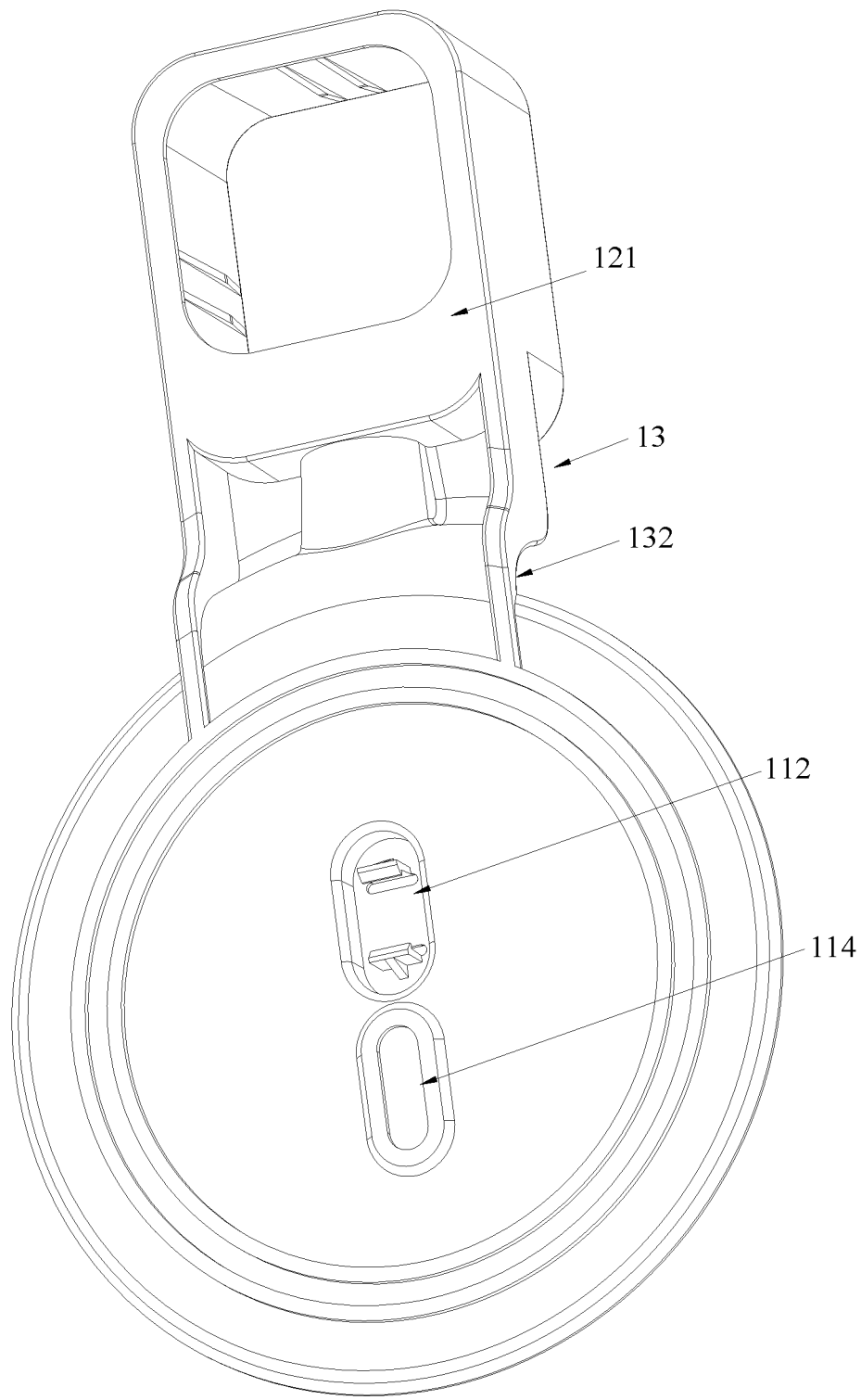
FIG. 5 is a schematic diagram of a front view of a mounting bracket according to some embodiments of the present disclosure.

Referring to FIG. 5, a mounting hole 114 is disposed at the first mounting member 11. When the whole electronic device and the mounting bracket 10 are hung up on the wall through the adaptor 30, connection strength of the whole structure and the wall can be tested. If the connection strength is not enough, a self-tapping screw may be punched into the wall through the mounting hole 114 to enhance the connection strength between the mounting bracket and the wall, thereby enhancing the connection strength between the electronic device and the wall.

The mounting hole 114 and the position-limiting unit 111 are arranged along the first direction X with an interval. The mounting hole 114 also has the racetrack shape (e.g., a rectangle with a pair of semi-circles positioned at opposite ends). The length extension direction (longitudinal direction) of the mounting hole 114 is the same as the length extension direction (longitudinal direction) of the position-limiting unit 111. The present disclosure does not limit the number and position of the mounting hole 114.

Referring to FIG. 4 and FIG. 6, the mounting hole 114 is a counterbore. The cap of the self-tapping screw may be accommodated in the counterbore, which does not affect the fitted connection between the first mounting member 11 and the body 20. During manufacturing, the corresponding position of the first mounting member 11 may be concaved from the side that receives the body 20 to the opposite side that faces away from the body 20, then, a hole is opened to form the mounting hole 114, and the manufacturing process is simple.

In some embodiments, referring to FIG. 4 to FIG. 6, a containing chamber 121 is disposed at the second mounting member 12. The containing chamber 121 goes through two opposite sides of the second mounting member 12 to form a first opening 122 and a second opening 123. The second opening 123 is arranged to face toward the wall, and the first opening 122 is arranged to face away from the wall. The first opening 122 is configured for the adaptor 30 to be placed into the containing chamber 121. The second opening 123 is configured for the pins of the plug the adaptor 30 to pass through. The size of the cross-section of the first opening 122 is set to be larger than the size of the cross-section of the adaptor 30. The size of the cross-section of the second opening 123 is set to be smaller than the size of the cross-section of the adaptor 30 to allow the pins of the adaptor 30 to pass through. The cross-section, as used herein, refers to the plane perpendicular to the Y direction. During installation, the adaptor 30 may be placed into the containing chamber 121 from the first opening 122, and the pins of the adaptor 30 may pass through the second opening 123 and be plugged into the socket on the wall.

Referring to FIG. 4 and FIG. 6, the containing chamber 121 includes a side notch 126 that passes through a side of the containing chamber 121 close to the connector 13. The side notch 126 is on a side of the second mounting member 12 near the first mounting member 11. The side notch 126 may be configured for the cable 40 of the adaptor 30 to pass through.

Referring to FIG. 4 and FIG. 6, an elastic strip 124 is arranged on the sidewall of the containing chamber 121. The elastic strip 124 is configured to abut the outside wall of the adaptor 30 elastically, such that the adaptor 30 can be fitted tightly in the containing chamber 121, which enhances the installation strength of the adaptor 30 at the second mounting member 12, and the adaptor 30 can be conveniently detached or installed.

The elastic strip 124 is arranged to protrude from the sidewall of the containing chamber 121. The elastic strip 124 extends along the depth direction of the containing chamber 121. The thickness of the elastic strip 124 increases from both ends to the middle along the length direction. Accordingly, middle section of the elastic strips 124 form abutting points that abut the adaptor 30.

Referring to FIG. 6, two elastic strips 124 are disposed on each of the four sidewalls of the containing chamber 121. The two elastic strips 124 are both located near a center position of each sidewall and are arranged with an interval. In some other embodiments, the elastic strips 124 may include other numbers and be disposed on different positions, which are not limited here.

Referring to FIG. 4 and FIG. 6, a connector 13 is provided between the first mounting member 11 and the second mounting member 12. The connector 13 includes a curved surface 132 and a position-limiting slot 131. The curved surface 132 is arranged close to the first mounting member 11 and is configured to contact and fit a part of the outer circumference of the body 20. The position-limiting slot 131 may be configured to connect between the curved surface 132 and the side notch 126 and limit the position of the cable 40. The side notch 126 connects between the containing chamber 121 and the position-limiting slot 131. An end of the cable 40 can be accommodated in the position-limiting slot 131 and pass through the side notch 126 to connect to the adaptor 30.

In some embodiments, referring to FIG. 5 and FIG. 6, the first mounting member 11, the connector 13, and the second mounting member 12 are integrally connected as a whole piece. As such, the first mounting member 11 and the second mounting member 12 may have a greater connection strength. That is, the mounting bracket 10 may have a better installation and fixation effect for the body 20 and the adaptor 30. By using the mounting bracket 10, the body 20 may be hung up on the wall together with the adaptor 30. In addition, by the integral connection configuration, the manufacturing process of the whole mounting bracket 10 may be simpler and have a lower cost. In some other embodiments, the first mounting member 11 and the second mounting member 12 may be designed separately. That is, the first mounting member 11 and the second mounting member 12 may be connected and interlocked by a fastener, which is not limited here.

Referring to FIG. 4, along the plug connection direction Y of the position-limiting unit 111, the thickness of the second mounting member 12 is greater than the thickness of the first mounting member 11.

The first mounting member 11 includes a first fitting surface 115 configured to touch and fit the wall surface. The first fitting surface 115 is a side surface of the first mounting member away from the body 20. The second mounting member 12 includes a second fitting surface 125 configured to touch and fit the socket surface. The second fitting surface 125 is a side surface of the second mounting member 12 corresponding to the second opening 123. The first fitting surface 115 and the second fitting surface 125 are apart for a first distance along the plug connection direction Y of the position-limiting unit 111. The surface of the socket protrudes from the wall surface with a second distance. The first distance is configured to adapt to the second distance.

The present disclosure further provides an electronic device including the body 20 and the adaptor 30. The electronic device may be detachably attached to the above disclosed mounting bracket 10. The body 20 may be detachably attached and fixed at the first mounting member 11 of the mounting bracket 10. The adaptor 30 may be detachably fixed at the second mounting member 12 of the mounting bracket 10. A plug slot 23 is disposed on the body 20. The plug slot 23 of the body 20 and the position-limiting unit 111 of the first mounting member 11 form a plug connection. After the disclosed electronic device is attached to the mounting bracket 10, the relative position between the body 20 and the adaptor 30 is fixed, which solves the problem of poor contact between the body 20 and the adaptor 30 after the adaptor is plugged into the socket. Meanwhile, the assembly combination of the electronic device and the mounting bracket has a compact structure, which is convenient to be installed or detached. In addition, the appearance of the assembly combination is aesthetic.

A second magnetic member 21 is disposed on the body 20. The first magnetic member 14 of the first mounting member 11 and the second magnetic member 21 attract each other to allow the body 20 to contact and fit the first mounting member 11. The adaptor 30 is mounted to the second mounting member 12. By arranging the first magnetic member 14 and the second magnetic member 21, after the adaptor 30 is plugged into the socket, the body 20 can also be hung up on the wall surface together with the adaptor 30, and the hanging connection is firm. Meanwhile, the appearance of the whole electronic device is aesthetic after being installed.

Referring to FIG. 4, the body 20 includes a housing. A second mounting slot 22 is arranged on the inner side of the housing. Like the first magnetic member 14, the second magnetic member 21 may also include a magnet. The second magnetic member 21 is accommodated in the second mounting slot 22. Like a fixation manner of fixing the first magnetic member 14 to the first mounting slot 112, the second mounting slot 22 may also be provided with a snap hook structure, and the second magnetic member 21 is snapped to the second mounting slot 22 by the snap hook structure.

Referring to FIG. 4, the plug slot 23 is formed by recessing the housing from the outside to the inside. The plug slot 23 is arranged back-to-back with the second mounting slot 22 (that is, the second mounting slot 22 is formed on the inner side of the housing and is arranged on opposite sides of a wall of the housing). The plug slot 23 has a racetrack shape. During the installation, the position-limiting unit 111 is inserted into the plug slot 23 to form a plug connection.

Figure 7:
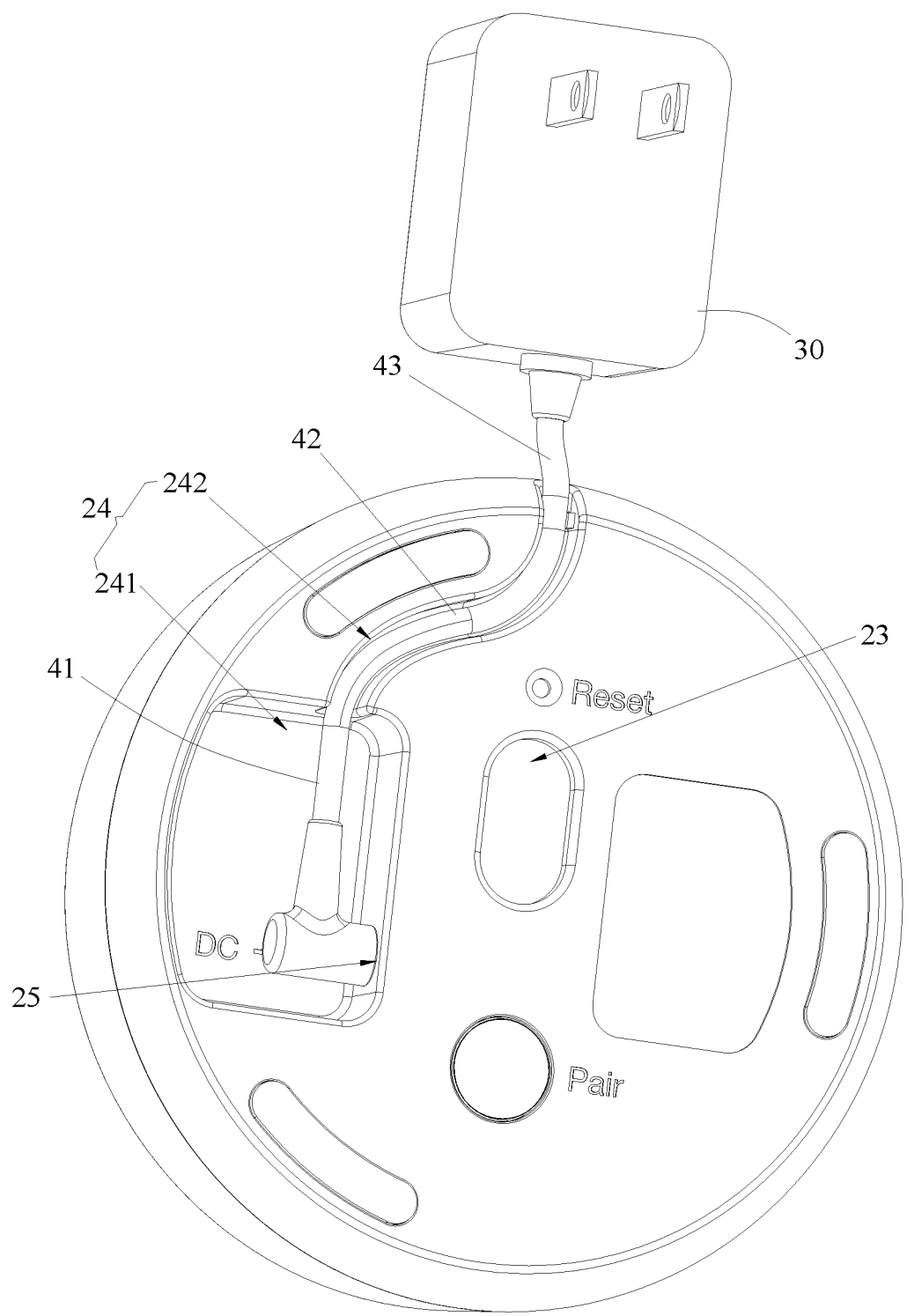
FIG. 7 is a schematic diagram of a perspective view of the electronic device shown in FIG. 1.

In some embodiments, referring to FIG. 3 and FIG. 7, the cable 40 connects the adaptor 30 with the body 20. A cable collection groove 24 is provided on an outer surface of one side of the body 20. The cable 40 is stowed in the cable collection groove 24. In some embodiments, the cable collection groove 24 is provided on the side of the body 20 that contacts the first mounting member 11. By arranging the cable collection groove 24 at the body 20 and arranging the cable collection groove 24 on the outer surface of the side of the body 20 that contacts the first mounting member 11, there is no need to configure an extra cable accommodation structure on the second mounting member 12. As such, the complexity of the structure of the mounting bracket 10 may be reduced, and the cable 40 may be shielded by the first mounting member 11 to avoid exposure, such that the appearance of the whole structure is aesthetic. In some other embodiments, the cable collection groove 24 may also be arranged on other sides of the body 20 for accommodating the cable 40, which is not limited here.

In some embodiments, referring to FIG. 7, the cable 40 includes a first end 41, a middle section 42, and a second end 43, which are connected sequentially. The first end 41 is configured to form a plug connection with the power supply circuit of the body 20. The second end 43 is connected to the adaptor 30. The cable collection groove 24 includes a first section 241 and a second section 242. The first section 241 is arranged close to the power supply circuit of the body 20. The first section 241 may have a rectangle cross section. The dimension of the first section 241 is larger than the dimension of the first end 41. The second section 242 curves and extends from the first section 241 to an outer edge of the body 20. The inner size of the second section 242 is compatible with the outer size of the middle section 42. The dimension of the first section 241 is larger than the dimension of the second section 242. The first end 41 is accommodated in the first section 241. The middle section 42 can be sequentially snapped into the second section 242 starting from the portion close to the first end 41 to the portion close to the second end 43. The second end 43 extends out from the second section 242 to connect to the adaptor 30. As such, during installation, the disclosed cable 40 can be fixed by a simple operation of snapping the middle section 42 into the second section 242, without the need of disentangling or sorting out the cable. If the middle section 42 of the cable 40 is relatively long, a portion of the middle section 42 may be accommodated into the first section 241.

Referring to FIG. 7, a power plug hole 25 is provided at the body 20. The power plug hole 25 starts from the first section 241 and extends to the inside of the body 20 to facilitate the electrical connection between the adaptor 30 and the electronic device.

Only some embodiments of the present disclosure are described above, which do not limit the present disclosure. Any modifications, equivalent replacement, and improvements within the spirit and principle of the present disclosure are within the scope of the present disclosure.

What is claimed is:

1. A mounting bracket comprising:
   a first mounting member configured to detachably accommodate a body of an electronic device and limit a position of the body, wherein a first magnetic member is disposed on the first mounting member, and the first magnetic member is configured to attract the body and attach the first mounting member to an outer wall of the body; and
   a second mounting member configured to detachably accommodate an adaptor of the electronic device and limit a position of the adaptor, the first mounting member being fixedly connected to the second mounting member.

2. The mounting bracket of claim 1, wherein a position-limiting unit is disposed on the first mounting member.

3. The mounting bracket of claim 2, wherein
   the first magnetic member and the position-limiting unit are arranged at the first mounting member with an interval.

4. The mounting bracket of claim 1, wherein the first magnetic member is disposed in a position-limiting unit disposed on the first mounting member.

5. The mounting bracket of claim 1, wherein
   a first mounting slot is disposed in the first mounting member,
   the first magnetic member is arranged in the first mounting slot.

6. The mounting bracket of claim 5, wherein
   one or two snap hooks are provided in the first mounting slot.

7. The mounting bracket of claim 5, wherein the first mounting slot extends inward from a side of the first mounting member away from the body.

8. The mounting bracket of claim 1, further comprising:
   a containing chamber configured to accommodate the adaptor and disposed on the second mounting member.

9. The mounting bracket of claim 8, wherein
   the containing chamber defines a first opening and a second opening.

10. The mounting bracket of claim 9, wherein
    the first opening is configured to receive the adaptor into the containing chamber.

11. The mounting bracket of claim 1, further comprising:
    a connector arranged between the first mounting member and the second mounting member.

12. The mounting bracket of claim 11, wherein the connector includes a position-limiting slot configured to limit a position of the cable.

13. The mounting bracket of claim 11,
    wherein the connector includes a curved surface that contacts a portion of the body.

14. An electronic device, comprising:
    a body configured to be detachably attached to a first mounting member of a mounting bracket, wherein a first magnetic member is disposed on the first mounting member, and the first magnetic member is configured to attract the body and attach the first mounting member to an outer wall of the body; and
    an adaptor configured to be detachably attached to a second mounting member of the mounting bracket, wherein a plug slot is disposed on the body, and the plug slot and a position-limiting unit on the first mounting member form a plug connection.

15. The electronic device of claim 14, further comprising:
    a second magnetic member configured to attract the first magnetic member.

16. The electronic device of claim 15, further comprising:
    a cable connecting the adaptor and the body.

17. The electronic device of claim 16, wherein
    the cable sequentially includes a first end, a middle section, and a second end and the body is configured to accommodate the middle section of the cable.

18. An electronic device, comprising:
a body configured to be detachably attached to a first mounting member of a mounting bracket, wherein a first magnetic member is disposed on the first mounting member, and the first magnetic member is configured to attract the body and attach the first mounting member to an outer wall of the body;
an adaptor configured to be detachably attached to a second mounting member of the mounting bracket; and
a cable connecting the adaptor and the body, wherein the cable is detachably stowed on an outside surface of the body.

19. The electronic device of claim 18, wherein the cable sequentially includes a first end, a middle section, and a second end,
and the body is configured to accommodate the middle section of the cable.

* * * * *